(12) United States Patent
Lu et al.

(10) Patent No.: US 12,442,899 B2
(45) Date of Patent: Oct. 14, 2025

(54) MEMS ACTUATED VIBRATORY RISLEY PRISM FOR LiDAR

(71) Applicant: BEIJING VOYAGER TECHNOLOGY CO., LTD., Beijing (CN)

(72) Inventors: Yue Lu, Mountain View, CA (US); Youmin Wang, Berkeley, CA (US)

(73) Assignee: BEIJING VOYAGER TECHNOLOGY CO., LTD., Beijing (CN)

(*) Notice: Subject to any disclaimer, the term of this patent is extended or adjusted under 35 U.S.C. 154(b) by 1050 days.

(21) Appl. No.: 17/134,432

(22) Filed: Dec. 27, 2020

(65) Prior Publication Data

US 2022/0206121 A1 Jun. 30, 2022

(51) Int. Cl.
*G01S 7/481* (2006.01)
*G01S 17/931* (2020.01)
(Continued)

(52) U.S. Cl.
CPC .......... *G01S 7/4817* (2013.01); *G01S 17/931* (2020.01); *G02B 5/04* (2013.01); *G02B 26/085* (2013.01);
(Continued)

(58) Field of Classification Search
CPC ...... G01S 7/4814; G01S 7/4817; G01S 7/484; G01S 17/931; G02B 5/04; G02B 26/085;
(Continued)

(56) References Cited

U.S. PATENT DOCUMENTS

| 2005/0264131 A1* | 12/2005 | Hong | H02N 1/008 |
| | | | 318/116 |
| 2013/0033732 A1* | 2/2013 | Davis | G02B 26/085 |
| | | | 359/198.1 |

(Continued)

OTHER PUBLICATIONS

MTK. Hou, JY. Huang, SS. Jiang, JA Yeh, "In-plane rotary comb-drive actuator for a variable optical attenuator," 2008, Journal of Micro/Nanolithography, MEMS, and MOEMS, vol. 7, Issue 4, pp. 1-6 (Year: 2008).*

*Primary Examiner* — Yashita Sharma
*Assistant Examiner* — Isabelle Lin Boegholm
(74) *Attorney, Agent, or Firm* — BAYES PLLC

(57) ABSTRACT

Embodiments of the disclosure provide a transmitter containing a Risley prism-based scanning mechanism, an optical sensing system containing the same, and an optical sensing method using the same. For example, the optical sensing system includes a laser emitter configured to sequentially emit a series of optical signals. The optical sensing system further includes a plurality of prisms configured to receive the series of optical signals and sequentially direct the series of optical signals at different directions in an angle of view of the optical sensing system. At least one prism of the plurality of prisms is configured to rotate relative to at least one other prism of the plurality of prisms to refract the optical signals towards the respective different directions. The optical sensing system additionally includes a receiver configured to receive at least a portion of the series of optical signals reflected from an environment surrounding the optical sensing system.

15 Claims, 8 Drawing Sheets

(51) Int. Cl.
  *G02B 5/04* (2006.01)
  *G02B 26/08* (2006.01)
  *G02B 26/10* (2006.01)
(52) U.S. Cl.
  CPC ..... *G02B 26/0875* (2013.01); *G02B 26/0891* (2013.01); *G02B 26/10* (2013.01); *G02B 26/108* (2013.01)
(58) Field of Classification Search
  CPC .. G02B 26/0875; G02B 26/10; G02B 26/108; G02B 27/0972; G02B 27/0977; G02B 26/0891
  See application file for complete search history.

(56) References Cited

U.S. PATENT DOCUMENTS

| | | | |
|---|---|---|---|
| 2017/0117825 A1* | 4/2017 | Jourdan | B81B 3/0024 |
| 2018/0173000 A1* | 6/2018 | Rothberg | G02B 19/0052 |
| 2018/0287459 A1* | 10/2018 | Huang | B64U 30/20 |
| 2019/0094341 A1* | 3/2019 | Ishinabe | G01S 7/4814 |
| 2019/0383918 A1* | 12/2019 | Wang | G01S 7/4817 |
| 2020/0033454 A1* | 1/2020 | Hong | G01S 17/89 |

* cited by examiner

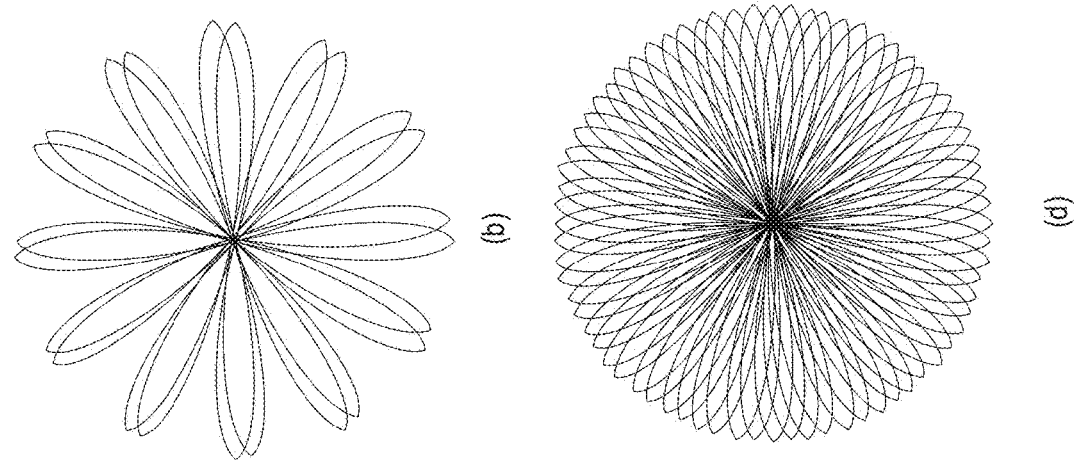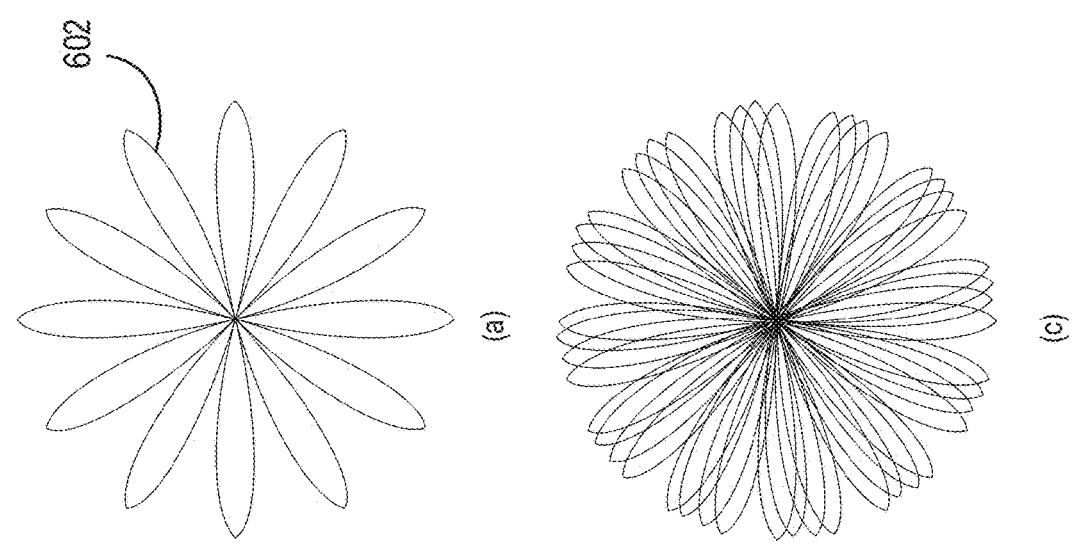
FIG. 6

MEMS ACTUATED VIBRATORY RISLEY PRISM FOR LiDAR

TECHNICAL FIELD

The disclosure relates to a light detection and ranging (LiDAR) system, and more particularly to, a MEMS actuated Risley prism pair for steering laser beams in the LiDAR system.

BACKGROUND

Raster scanning patterns are currently the most used scanning patterns in LiDAR applications. Gimbaled mirrors through either mechanical motorized or MEMS actuated mirrors are the major types of beam steering elements for raster scanning. However, resolution and angular range of raster scanning are limited by how much and how fast the mirrors can rotate.

Risley prisms are originally used by ophthalmologists to measure binocular accommodation (e.g., the ability for the optical axes of two eyes to converge for nearby objects), and thus have a relatively small angular range. More recently, Risley prisms have been designed to cover a wider range of angles. Different from raster scanning, the rotation speeds of the Risley prism pair are typically different, and thus for each frame of the LiDAR ranging the scanning path is different. The non-repetitive scanning path enables a higher resolution due to a longer time to scan with more frames being taken during the scan. However, there are remaining challenges to adopt Risley prism for LiDAR scanning. In particular, the rotational movement of the Risley prisms is typically driven by the mechanical motors, which makes them difficult to make a solid-state steering device.

Embodiments of the disclosure address the above problems by including a MEMS-based angular comb drive actuator-driven Risley prism pair for steering laser beams in a LiDAR system.

SUMMARY

Embodiments of the disclosure provide an exemplary optical sensing system. The optical sensing system includes a laser emitter configured to sequentially emit a series of optical signals. The optical sensing system further includes a plurality of prisms configured to receive the series of optical signals and sequentially direct the series of optical signals at different directions in an angle of view of the optical sensing system. At least one prism of the plurality of prisms is configured to rotate relative to at least one other prism of the plurality of prisms to refract the optical signals towards the respective different directions. The optical sensing system additionally includes a receiver configured to receive at least a portion of the series of optical signals reflected from an environment surrounding the optical sensing system.

Embodiments of the disclosure further provide an exemplary optical sensing method. The method includes sequentially emitting, by a laser emitter, a series of optical signals. The method further includes directing, by a plurality of prisms, the series of optical signals at different directions in an angle of view of the optical sensing system by rotating at least one prism of the plurality of prisms relative to at least one other prism of the plurality of prisms to refract the optical signals towards the respective different directions. The method additionally includes receiving, by a receiver of the optical sensing system, at least a portion of the series of optical signals reflected from an environment surrounding the optical sensing system.

Embodiments of the disclosure additionally provide a prism-based scanning mechanism. The prism-based scanning mechanism includes a plurality of prisms, and a ring-shaped mounting structure surrounded by the plurality of prisms. The prism-based scanning mechanism further includes a plurality of MEMS-based angular comb drive actuators circularly mounted around an outer edge of the ring-shaped mounting structure. The prism-based scanning mechanism additionally includes at least one controller coupled to the plurality of MEMS-based angular comb drive actuators to control a rotation of each of the plurality of prisms.

It is to be understood that both the foregoing general description and the following detailed description are exemplary and explanatory only and are not restrictive of the disclosure, as claimed.

BRIEF DESCRIPTION OF THE DRAWINGS

FIG. 6 illustrates a schematic diagram of an exemplary Risley prism-based scan pattern over different durations, according to embodiments of the disclosure.

DETAILED DESCRIPTION

Figure 1:
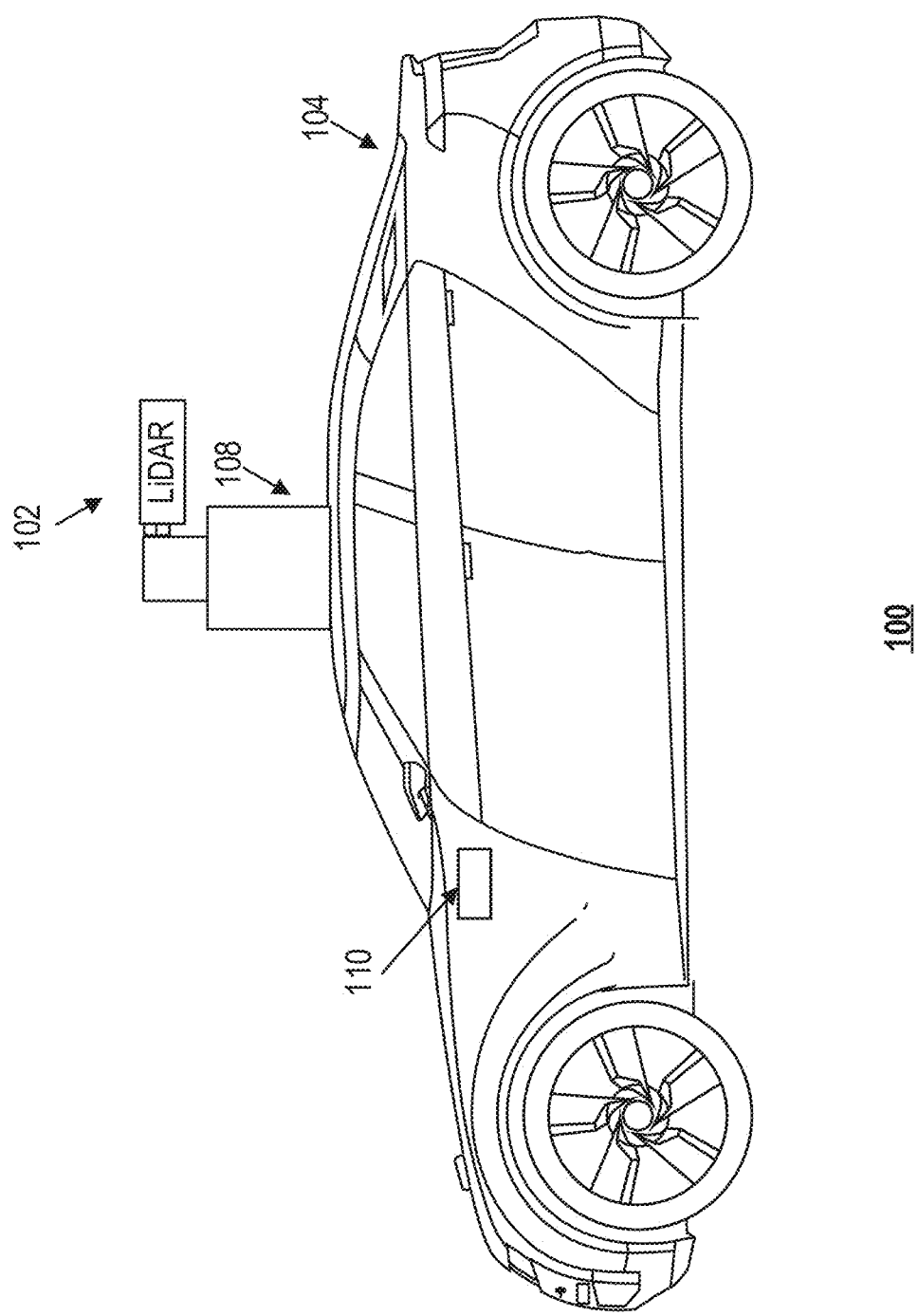
FIG. 1 illustrates a schematic diagram of an exemplary vehicle equipped with a LiDAR system containing a Risley prism-based scanning mechanism, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

Embodiments of the disclosure provide a Risley prism-based scanning mechanism in a transmitter of a LiDAR system. According to one example, a Risley prism-based scanning mechanism may be disposed after a collimation lens of the transmitter on the optical path. The Risley prism-based scanning mechanism may include a pair of Risley prisms arranged along the optical axis of the transmitter. The Risley prism pair may include two prisms with a same or different physical wedge angle that, when operated in series and rotated about a common optical axis, bend or deviate an optical beam passing through the prism pair. Minimum deviation (or no deviation) occurs when the two prisms are in opposition, maximum deviation occurs when the prism apexes are aligned, and intermediate deviations are achieved by rotating the prisms with respect to each other (e.g., the two prisms rotate at different rotation directions and/or different speeds). Accordingly, rotating a pair of Risley prisms with their locations fixed relative to each other traces out a circle with a maximum cone angle of deviation defined by the prism materials and wedge angles. Prisms can be made of a single material for single-wavelength operation or can be achromatic to accommodate a broader spectral range.

Each Risley prism may be integrated into respective MEMS-based angular comb drive actuators, which control the Risley prism to rotate independently from the other Risley prism, e.g., each Risley prism may be controlled to rotate at its direction and speed. The MEMS-based angular comb drive actuators may include a plurality of angular comb drives that encircle a Risley prism in the center. The force applied by the MEMS-based angular comb drive actuators may drive the respective Risley prism to rotate about its center. Two Risley prisms may be controlled to rotate at different speeds and directions, depending on the configurations of the MEMS-based angular comb drive actuators and voltage differentials applied to these MEMS-based angular comb drive actuators. The integration of Risley prisms into MEMS-based angular comb drive actuators may make a solid-state steering device feasible, and thus enable the application of Risley prism-based steering device in LiDAR systems and other optical sensing systems.

The features and advantages described herein are not all-inclusive and many additional features and advantages will be apparent to one of ordinary skill in the art in view of the figures and the following descriptions.

The disclosed LiDAR system containing a Risley prism-based scanning mechanism can be used in many applications. For example, the disclosed LiDAR system can be used in advanced navigation technologies, such as to aid autonomous driving or to generate high-definition maps, in which the optical sensing system can be equipped on a vehicle.

FIG. 1 illustrates a schematic diagram of an exemplary vehicle equipped with an optical sensing system containing a Risley prism-based scanning mechanism, according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with an optical sensing system, e.g., a LiDAR system 102 (also referred to as "LiDAR system 102" hereinafter) mounted to a body 104 via a mounting structure 108. Mounting structure 108 may be an electromechanical device installed or otherwise attached to body 104 of vehicle 100. In some embodiments of the disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a transmitter of LiDAR system 102 may be configured to scan the surrounding environment using the disclosed Risley prism-based scanning mechanism. LiDAR system 102 measures distance to a target by illuminating the target with laser beams and measuring the reflected/scattered pulses with a receiver. The laser beams used for LiDAR system 102 may be ultraviolet, visible, or near-infrared, and may be pulsed or continuous wave laser beams. In some embodiments of the disclosure, LiDAR system 102 may capture point clouds including depth information of the objects in the surrounding environment, which may be used for constructing a high-definition map or 3-D buildings and city modeling. As vehicle 100 moves along the trajectory, LiDAR system 102 may continuously capture data including the depth information of the surrounding objects (such as moving vehicles, buildings, road signs, pedestrians, etc.) for map, building, or city modeling construction.

Figure 2:
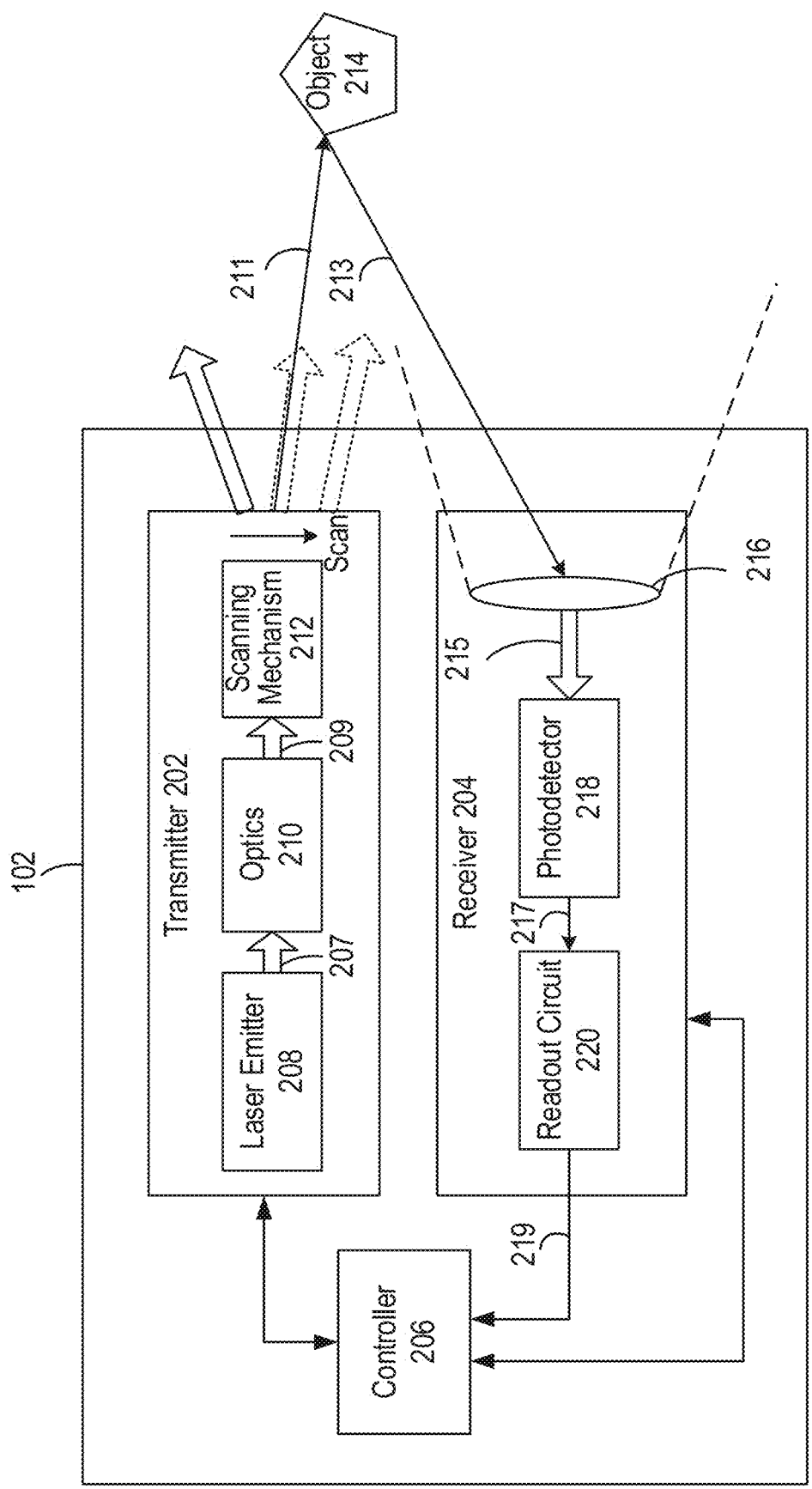
FIG. 2 illustrates a block diagram of an exemplary LiDAR system containing a Risley prism-based scanning mechanism, according to embodiments of the disclosure.

FIG. 2 illustrates a block diagram of an exemplary LiDAR system containing a Risley prism-based scanning mechanism, according to embodiments of the disclosure. In some embodiments, LiDAR system 102 may be a scanning flash LiDAR, a semi-coaxial LiDAR, a coaxial LiDAR, etc. As illustrated, LiDAR system 102 may include a transmitter 202, a receiver 204, and a controller 206 coupled to transmitter 202 and receiver 204. Transmitter 202 may further include a laser emitter 208 for emitting a series of optical signals and optics 210 for collimating the emitted optical signals. As illustrated in FIG. 2, transmitter 202 may additionally include a Risley prism-based scanning mechanism 212 (which may be simply referred to as scanning mechanism 212 as illustrated in FIG. 2) for steering the collimated optical signals to a specific scan pattern. Receiver 204 may further include a receiving lens 216, a photodetector 218, and a readout circuit 220.

Transmitter 202 may emit optical beams (e.g., pulsed laser beams, continuous wave (CW) beams, frequency modulated continuous wave (FMCW) beams) along multiple directions. Transmitter 202 may include a laser emitter 208, optics 210, and a Risley prism-based scanning mechanism 212. According to one example, transmitter 202 may sequentially emit a stream of laser beams in different directions within a scan filed-of-view (FOV) (e.g., a range in angular degrees), as illustrated in FIG. 2. Risley prism-based scanning mechanism 212 may steer the stream of laser beams into these different directions.

Laser emitter 208 may be configured to emit laser beams 207 (also referred to as "native laser beams") to optics 210. For instance, laser emitter 208 may generate laser beams in the ultraviolet, visible, or near-infrared wavelength range, and provide the generated laser beams to optics 210. In some embodiments of the disclosure, depending on underlying laser technology used for generating laser beams, laser emitter 208 may include one or more of a double heterostructure (DH) laser emitter, a quantum well laser emitter, a quantum cascade laser emitter, an interband cascade (ICL) laser emitter, a separate confinement heterostructure (SCH) laser emitter, a distributed Bragg reflector (DBR) laser emitter, a distributed feedback (DFB) laser emitter, a vertical-cavity surface-emitting laser (VCSEL) emitter, a vertical-external-cavity surface-emitting laser (VECSEL) emitter, an extern-cavity diode laser emitter, etc., or any combination thereof. Depending on the number of laser emitting units in a package, laser emitter 208 may include a single emitter containing a single light-emitting unit, a multi-emitter unit containing multiple single emitters packaged in a single chip, an emitter array or laser diode bar containing multiple (e.g., 10, 20, 30, 40, 50, etc.) single emitters in a single substrate, an emitter stack containing multiple laser diode bars or emitter arrays vertically and/or horizontally built up in a single package, etc., or any combination thereof. Depending on the operating time, laser emitter 208 may include one or more of a pulsed laser diode (PLD), a CW laser diode, a Quasi-CW laser diode, etc., or any combination thereof. Depending on the semiconductor materials of diodes in laser emitter 208, the wavelength of incident laser beams 207 may be at different values, such as 760 nm, 785 nm, 808 nm, 848 nm, 870 nm, 905 nm, 940 nm, 980 nm, 1064 nm, 1083 nm, 1310 nm, 1370 nm, 1480 nm, 1512 nm, 1550 nm, 1625 nm, 1654 nm, 1877 nm, 1940 nm, 2000 nm, etc. It is understood that any suitable laser source may be used as laser emitter 208 for emitting laser beams 207 at a proper wavelength.

Optics 210 may include optical components (e.g., lenses, mirrors) that can shape the laser light and collimate the laser light into a narrow laser beam 209 to increase the scan resolution and the range to scan object(s) 214. Scanning mechanism 212 may include various optical elements such as prisms, mirrors, gratings, optical phased array (e.g., liquid crystal-controlled grating), or any combination thereof. Consistent with embodiments of the disclosure, scanning mechanism 212 in LiDAR system 102 may be a Risley prism-based scanning mechanism. In some embodiments, object(s) 214 may be made of a wide range of materials including, for example, non-metallic objects, rocks, rain, chemical compounds, aerosols, clouds, and even single molecules. In some embodiments, at each time point during the scan, a Risley prism-based scanning mechanism may steer laser beams 211 to object(s) 214 in a different direction within a range of scanning angles by rotating one or more Risley prisms, as described in more detail in FIGS. 3-8.

Receiver 204 may be configured to detect returned laser beams 213 returned from object(s) 214. Upon contact, laser light can be reflected/scattered by object(s) 214 via backscattering, such as Rayleigh scattering, Mie scattering, Raman scattering, and fluorescence. Returned laser beams 213 may be in a same or different direction from laser beams 211. In some embodiments, receiver 204 may collect laser beams returned from object(s) 214 and output signals reflecting the intensity of the returned laser beams.

As illustrated in FIG. 2, receiver 204 may include a receiving lens 216, a photodetector 218, and a readout circuit 220. Receiving lens 216 may be configured to focus and converge each returning laser beams directly on photodetector 218 as a focused laser beam 215.

Photodetector 218 may be configured to detect the focused laser beams 215. In some embodiments, photodetector 218 may convert a laser beam 215 into an electrical signal 217 (e.g., a current or a voltage signal). Electrical signal 217 may be an analog signal which is generated when photons are absorbed in a photodiode included in photodetector 218. In some embodiments, photodetector 218 may include a PIN detector, an avalanche photodiode (APD) detector, a single photon avalanche diode (SPAD) detector, a silicon photo multiplier (SiPM) detector, or the like. In some embodiments, photodetector 218 may include a plurality of photosensors or pixels arranged in a one-dimensional or two-dimensional array.

Readout circuit 220 may be configured to integrate, amplify, filter, and/or multiplex signal detected by photodetector 218 and transfer the integrated, amplified, filtered, and/or multiplexed signal 219 onto an output port (e.g., controller 206) for readout. In some embodiments, readout circuit 220 may act as an interface between photodetector 218 and a signal processing unit (e.g., controller 206). Depending on the configurations, readout circuit 220 may include one or more of a transimpedance amplifier (TIA), an analog-to-digital converter (ADC), a time-to-digital converter (TDC), or the like.

Controller 206 may be configured to control transmitter 202 and/or receiver 204 to perform detection/sensing operations. For instance, controller 206 may control laser emitter 208 to emit laser beams 207, or control photodetector 218 to detect returning laser beams 215. In some embodiments, controller 206 may also implement data acquisition and analysis. For instance, controller 206 may collect digitalized signal information from readout circuit 220, determine the distance of object(s) 214 from LiDAR system 102 according to the travel time of laser beams, and construct a high-definition map or 3-D buildings and city modeling surrounding LiDAR system 102 based on the distance information of object(s) 214. In some embodiments, controller 206 may be further coupled to Risley prism-based scanning mechanism 212 to control the rotation of the Risley prisms, as further described in detail below.

Figure 3C:
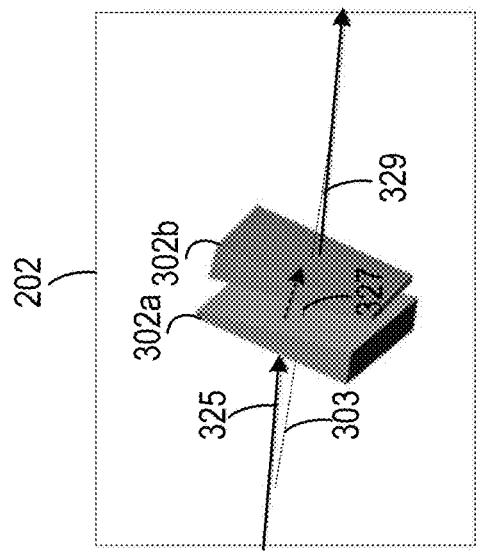
FIGS. 3A-3C each illustrate a schematic diagram of a side view of an exemplary rotary Risley prism pair with different rotation angles, according to embodiments of the disclosure.
Figure 3B:
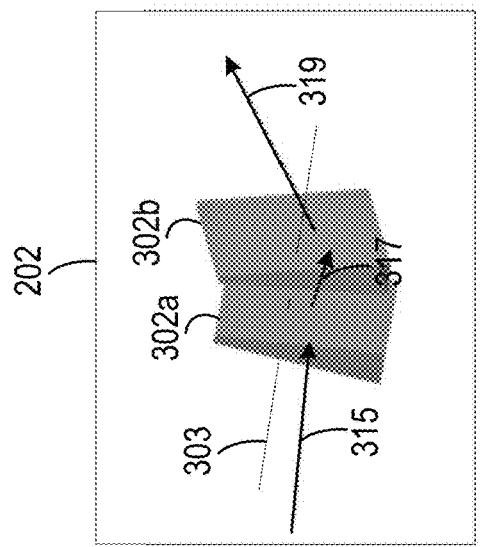
Figure 3A:
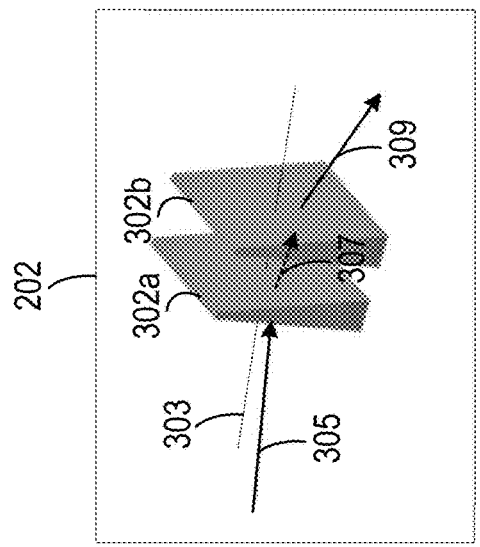

FIGS. 3A-3C each illustrate a schematic diagram of a side view of an exemplary rotary Risley prism pair with different rotation angles, according to embodiments of the disclosure. As illustrated in the figure, the Risley prism-based beam steering may use a Risley prism pair, which may include two prisms 302a and 302b for light steering or scanning (i.e., functioning as the scanning mechanism 212 of LiDAR system 102). Each prism 302a or 302b may have at least one surface being angled, and each prism 302a or 302b may have a shaped cross-section that can be a rectangular, square, trapezoid, triangle, circle, ellipse, or can be other proper shapes. In addition, each prism 302a or 302b may be made of a same or different material that is transparent to the wavelengths of laser beams emitted by laser emitter 208 of LiDAR system 102. Such material may include glass, plastic, fluorite, etc. In some embodiments, materials with a high refractive index may be used for making the prisms in order to achieve a large angle of view for LIDAR system 102.

According to some embodiments of the disclosure, the two prisms 302a and 302b may be placed next to each other along an optical axis (e.g., optical axis 303 in FIGS. 3A-3B). Each prism 302a or 302b may refract or "bend" a laser beam passing through the prism, and thus deviate the laser beam from its original or previous direction. In some embodiments, the central axes for the prisms 302a and 302b may coincide with each other or with a small angle in-between. While only two prisms 302a and 302b are illustrated in FIGS. 3A-3C, the disclosure is not limited to such configuration and may include more than two prisms in Risley prism-based scanning mechanism 212. For example, having more prisms may further refract the light beam going through the scanning mechanism and thus achieve a larger angle of view.

Consistent with embodiments of the disclosure, under a certain controlling mechanism, the prisms 302a and 302b may rotate about a same axis (e.g., optical axis 303, as illustrated in FIGS. 3A-3C). In some embodiments, the rotation speed, direction, and frequency of the two prisms may be different, so that the relative angle between the two prisms can change with time. Thus, when a laser beam passes through the differently rotating prisms 302a and 302b, the direction of the outgoing beam of the prisms may change continuously with time, simulating a steering effect.

For instance, in FIG. 3A, under a first scenario, two prisms 302a and 302b may be positioned when prism apexes of prisms 302a and 302b are aligned. In this scenario, a laser beam 305 from optics 210 and traveling along the optical axis may be incident upon the first prism 302a at the first surface at a certain angle. Laser beam 305 may be bent after passing through prism 302a, to form a laser beam 307, which may be traveling in a different direction from laser beam 305 and may deviate from optical axis 303, as illustrated in FIG. 3A. When laser beam 307 incidents upon the second prism 302b, the second prism 302b may further bend laser beam 307 to form a laser beam 309, which may be in a direction different from laser beam 307 and may deviate the laser beam further from optical axis 303. That is, the two prisms 302a and 302b may collectively act like a single prism that refracts laser beam 307 for a refraction angle that equal to the refraction angles of the two prisms. Accordingly, the final direction of laser beam 309 may have a larger deviation angle from the original incident direction compared to passing through one prism. The deviation shown by FIG. 3A may represent a maximum deviation that occurs when the prism apexes of the two prisms are aligned.

Under a second scenario, the two prisms 302a and 302b may rotate about optical axis 303 but in opposite directions and by a same small angle, as illustrated in FIG. 3B. In this scenario, a laser beam 315 from optics 210 and traveling along the optical axis may be incident upon the first prism 302a at the first surface at a certain angle. Laser beam 315 may be bent after passing through prism 302a, to form a laser beam 317, which may be at a different direction from laser beam 315 and may deviate from the optical axis, as illustrated in FIG. 3B. When laser beam 317 incidents onto second prism 302b, second prism 302b may bend laser beam 317 again to form a laser beam 319, which again may be in a direction different from laser beam 317. However, due to the rotation of prisms 302a and 302b in opposite directions, the second prism 302b may bend laser beam 317 in a way that offsets the refraction angle caused by prism 302a, and the laser beam is reverted to the optical axis 303 to some extent. Accordingly, the final direction of the laser beam 319 may be deviated by a small amount but remain close to the plane defined by the optical axis, as illustrated in FIG. 3B.

Under a third scenario, the two prisms 302a and 302b may rotate about optical axis 303 but in opposite directions and both by a 90° from a scenario in which the prism apexes of the two prisms are aligned. In this scenario, the two prisms 302a and 302b may combine to act as a parallel plate, as illustrated in FIG. 3C. Accordingly, when the first prism 302a bends an incident laser beam 325 to laser beam 327 to deviate the laser beam away from the optical axis 303, the second prism 302b may offset the refraction angle of the first prism 302a entirely and revert the traveling direction of the resulted laser beam (i.e., laser beam 329 reverted to a direction similarly to laser beam 325). That is, minimum deviation (or no deviation) occurs when the two prisms are in opposition.

In some embodiments, the two prisms 302a and 302b may be in other various positions different from the above scenarios, and thus may deviate an incident laser beam to different directions. Therefore, by rotating one or both of the prisms 302a and 302b relative to each other, the incident beam may be steered over a continuous range of directions in different azimuth and elevation angles.

Consistent with embodiments of the disclosure, different mechanisms may be applied to independently control the rotations (in a clockwise or anti-clockwise direction) of the prisms to achieve different azimuth and elevation angles of scanning. According to one embodiment, the rotation of the prisms may be controlled by angular comb drive actuators, as further described in detail below in connection with FIGS. 4A-4B. It is to be noted that, while the angular comb drive actuators are described as MEMS-actuated in FIGS. 4A-4B and in other parts of the specification, the disclosure is not limited to such actuation mechanism, and may include any other suitable actuation mechanisms for actuating the described angular comb drives. These other actuation mechanisms may include electro-thermal, piezo-electric, and electromagnetic actuation mechanisms, and the like.

Figure 4B:
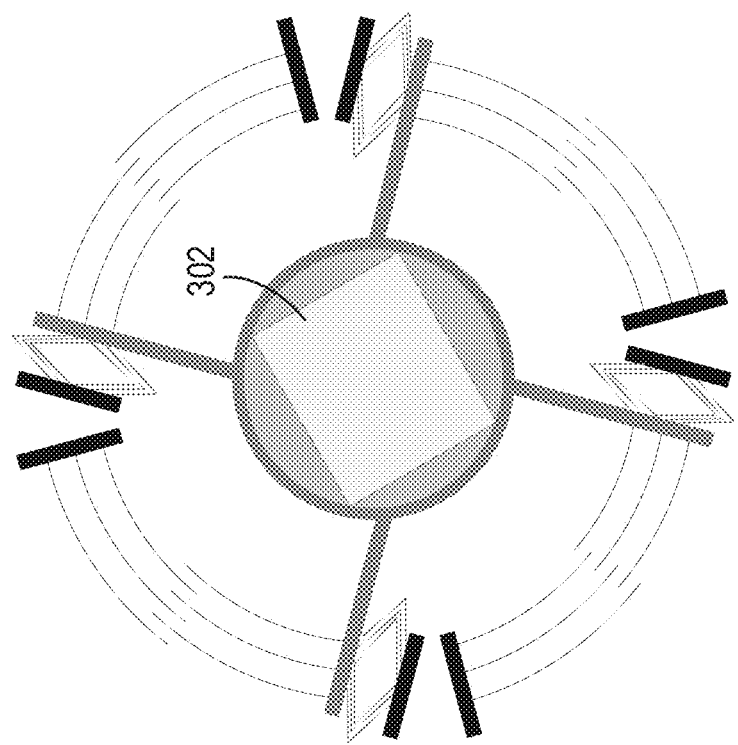
FIG. 4B illustrates a schematic diagram of a top view of an exemplary MEMS-based angular comb drive actuator-based platform with an integrated Risley prism shown, according to embodiments of the disclosure.
Figure 4A:
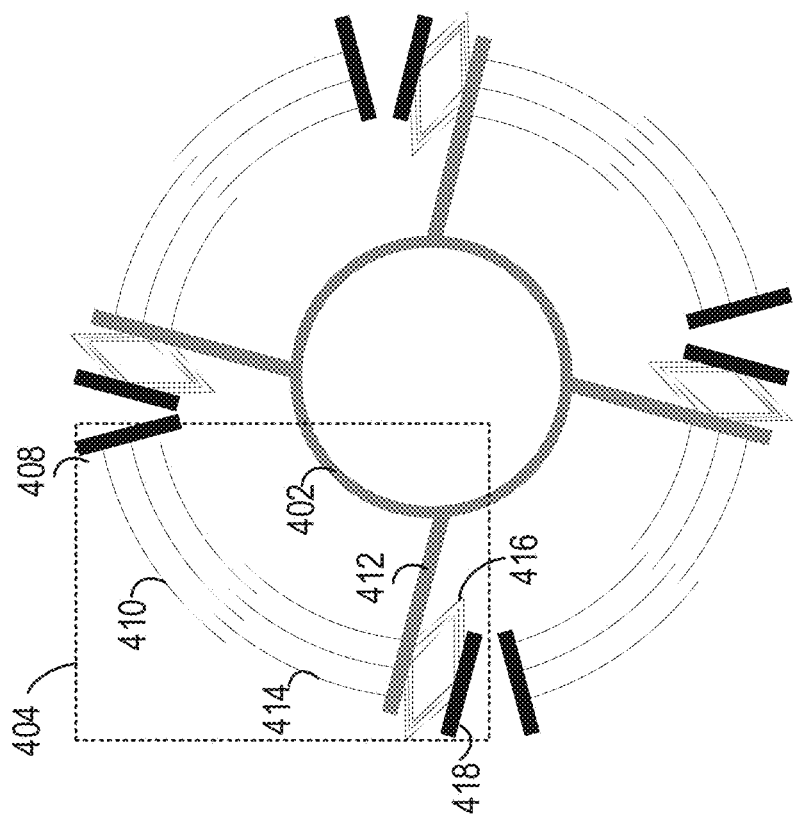
FIG. 4A illustrates a schematic diagram of a top view of an exemplary MEMS-based angular comb drive actuator-based platform without showing an integrated Risley prism, according to embodiments of the disclosure.

FIGS. 4A-4B each illustrate a schematic diagram of a top view of an exemplary MEMS-based angular comb drive actuator-based platform without or with an integrated Risley prism shown respectively, according to embodiments of the disclosure. As illustrated, a Risley prism 302 (e.g., 302a or 302b in FIGS. 3A-3B) may be integrated into a support platform comprising a plurality of angular comb drive actuators 404 forming a "tire" shape structure, where Risley prism 302 may be located at the center, while the plurality of angular comb drive actuators 404 may encircle the center. As illustrated, a MEMS-based angular comb drive actuator-based platform may include a ring-shaped mounting structure 402 that is rotatable when driven by the plurality of angular comb drive actuators 404. Risley prism 302 may be fixedly mounted around an inner edge or surface of the ring-shaped mounting structure 402 at different locations or edges. The controlled rotation of ring-shaped mounting structure 402 may thus cause the attached Risley prism to rotate at a certain speed and direction.

Each angular comb drive actuator 404 may include a stationary comb and a rotary comb. A stationary comb may include a stationary anchor 408 and a set of stationary teeth 410 fixed to the corresponding stationary anchor. Each stationary tooth may be an arc-shaped tooth. A rotary comb may include a rotary anchor 412, and a set of rotary teeth 414 fixed to the corresponding rotary anchor. Consistent with embodiments of the disclosure, rotary anchor 412 may be an elongated beam with one end fixedly mounted onto the outer edge of the ring-shaped mounting structure 402 and the other end being held by a spring structure 416. As shown in FIGS. 4A, rotary anchor 412 extends outwards from ring-shaped mounting structure 402. According to one embodiment, a spring structure 416 may be a Chevron spring beam that includes a number of (e.g., one, two, three, four, etc.) pairs of plates. These plates may be equally spaced and may be vulcanized together with rubber in a pair of "V" chevron shapes that face each other to form a rhombus shape. As illustrated in FIG. 4A, the Chevron spring beam 416 may be installed between rotary anchor 412 on one side and a second stationary anchor 418 on the other side of the pair of "V" chevron shapes. Once installed, the Chevron spring beam 416 may function as a damper for suspension and may provide compliance in the radial direction, while restraining any other degree-of-freedom (e.g., restricting movements in other directions), thereby facilitating the rotary movements of rotary anchor 412.

Consistent with embodiments of the disclosure, each tooth in a set of stationary teeth 410 or a set of rotary teeth 414 may have a predefined width or a width range, have an arc shape, and have a different length from neighboring teeth to comply with the arc structure of each set of stationary or rotary teeth. Further, stationary teeth 410 and rotary teeth 414 may be also tightly spaced and interleaved with each other when a rotary comb radially moves towards the corresponding stationary comb. Accordingly, a gap between adjacent comb teeth may be spaced in a way to ensure that there is no contact between the teeth during the movement of the rotary comb. In some embodiments, the smoothness of the teeth may also be controlled, to allow for tightly-packed formation of the interleaved combs. This may ensure the overall size of each comb drive to be scaled down to some extent, which is beneficial for a compact design of transmitter 202 of LiDAR system 102.

In some embodiments, the length of each tooth, the overlap between the stationary teeth and the rotary teeth in the absence of force, and the number of teeth on each stationary comb or rotary comb may be selected in consideration of the target force developed between stationary anchor 408 and rotary anchor 412, as well as the maximum rotation angle of Risley prism 302. According to one embodiment, the length of each tooth in the set of stationary teeth 410 or rotary teeth 414 may be at least long enough to accommodate the rotation of Risley prism 302 to a maximum rotation angle.

It is to be noted that, while FIGS. 4A-4B illustrates four MEMS-based angular comb drive actuators 404 in a support platform, the disclosure is not limited to such number of MEMS-based angular comb drive actuators 404. In some embodiments, it might be beneficial to increase the number of MEMS-based angular comb drive actuators 404 in a support platform to improve the stability of the radial movements of each MEMS-based angular comb drive actuator 404 due to the less travel distance available for each MEMS-based angular comb drive actuator. However, increasing the number of the MEMS-based angular comb drive actuators 404 in a support platform may result in a likely decrease in the maximum rotation angle of the attached Risley prism 302 and thus also a decrease in the filed of the view of LiDAR system 102. It may also reduce the number of possible scan patterns the scanning mechanism could realize. Therefore, the exact number of MEMS-based angular comb drive actuators 404 included in Risley prism-based scanning mechanism 212 may be a design parameter determined based on the requirements of the applications, among others.

FIG. 4B merely illustrates integration of one Risley prism into MEMS-based angular comb drive actuators. However, for the pair of Risley prisms to work properly, both Risley prisms 302a and 302b may be controlled to rotate, according to some embodiments. Therefore, both Risley prisms 302a and 302b may be integrated into a respective platform as shown in FIG. 4B. For instance, each of Risley prisms 302a and 302b may be separately integrated into such a platform. In this way, both Risley prisms 302a and 302b may rotate independently. For instance, Risley prism 302b may rotate clockwise at a first speed, while Risley prism 302a may rotate anti-clockwise at a second speed. Specific details regarding how to control the rotation of a Risley prism by MEMS-based angular comb drive actuators will be provided hereinafter with reference to FIGS. 5A-5B.

Figure 5B:
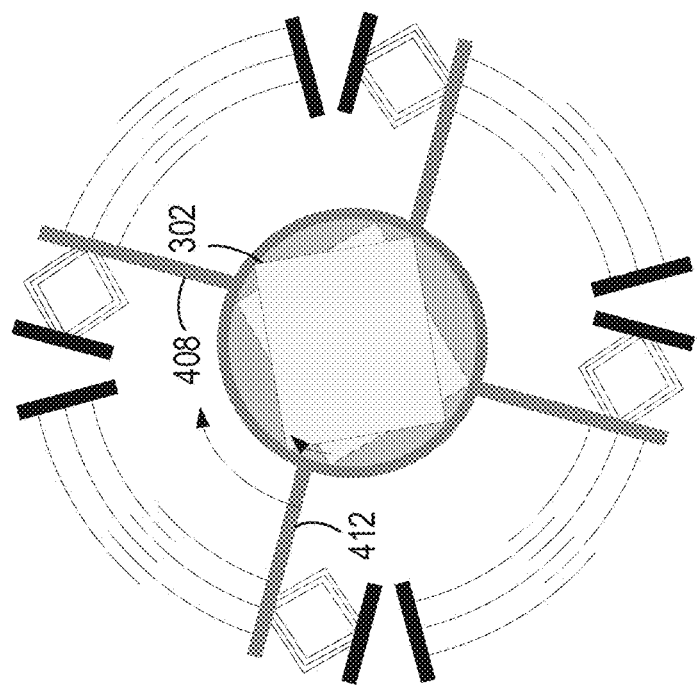
FIGS. 5A and 5B illustrate a schematic diagram of an exemplary control system for controlling a rotation of a Risley prism, according to embodiments of the disclosure.
Figure 5A:
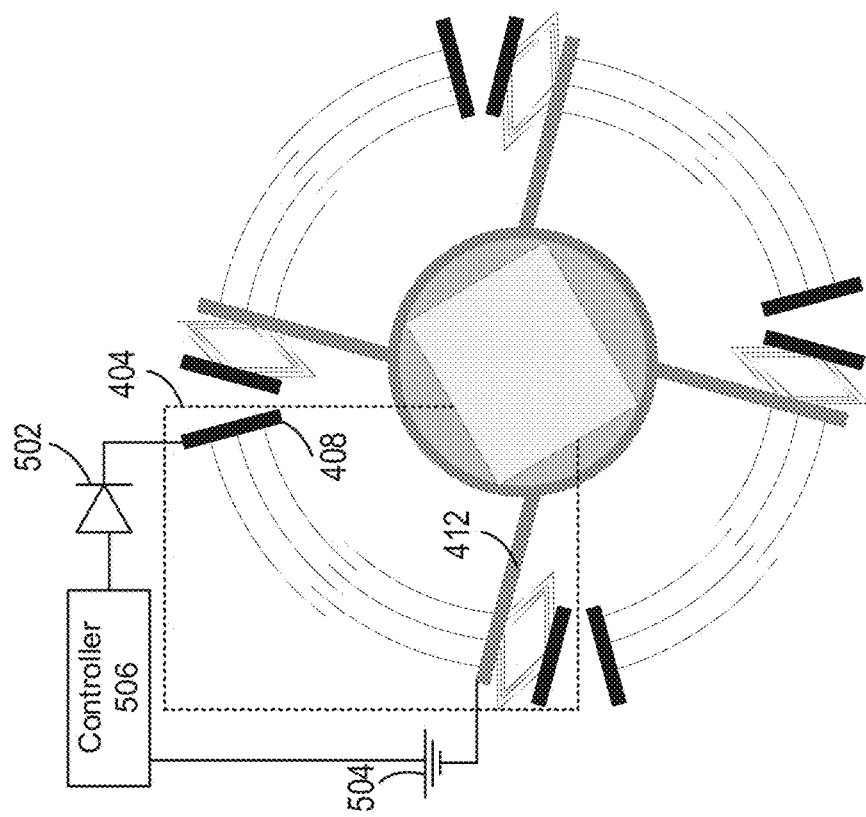

FIG. 5A illustrates a schematic diagram of an exemplary control system for controlling the rotation of a Risley prism. As illustrated, each angular comb drive actuator 404 of a Risley prism support platform may be coupled to an anode and a cathode. According to one example, a stationary anchor 408 may be electrically connected to an anode 502, while a rotary anchor 412 may be electrically connected to a cathode 504. The coupled anode 502/cathode 504 may apply a voltage differential between stationary anchor 408 and rotary anchor 412, thus creating a force that attracts rotary anchor 412 to radially move towards stationary anchor 408, as shown in FIG. 5B. Such radial movement may drag Risley prism 302 to rotate clockwise, as also shown in FIG. 5B.

In some embodiments, to control Risley prism 302 to actively rotate anti-clockwise, a different configuration may be constructed for a MEMS-based angular comb drive actuator-based platform. According to one embodiment, a mirrored configuration of the MEMS-based angular comb drive actuator-based platform in FIG. 5A may be constructed. In the mirrored configuration (not shown), when a voltage differential is applied to a stationary comb and a corresponding rotary comb, the corresponding rotary comb will move radially towards the stationary comb anti-clockwise.

In some embodiments, a controller 506 may specifically control the voltage differential applied to each angular comb drive actuator 404. For instance, controller 506 may be configured to control what type and/or what level of a voltage differential should be applied to angular comb drive actuator 404, and/or at what time a voltage differential should be applied, all of which together may allow a precise controlling of the radial movement of Risley prism 302. In some embodiments, controller 506 for angular comb drive actuator 404 may be the same as controller 206 for LiDAR system 102, as illustrated in FIG. 2. In some embodiments, controller 506 may be separate and independent of controller 206, and is a specialized controller specifically configured for angular comb drive actuator 404. In some embodiments, each of angular comb drive actuators 404 in a platform may be controlled by its respective controller 506. Alternatively, all of the angular comb drive actuators 404 in a platform may share a same controller 506. In some embodiments, each Risley prism may have a corresponding controller(s) 506. In some embodiments, a same controller 506 may control the relative orientations of both Risley prisms in the Risley prism pair, including controlling the simultaneous radial movements of the two Risley prisms in a same or opposite direction at a same or different speed.

In some embodiments, controller 506 may dynamically control the radial movements of the Risley prism pair according to the environment information surrounding a LiDAR system 102. For instance, if environment information sensed by LiDAR system 102 indicates more objects are located on the edge area of the current field of view of the LiDAR system, controller 506 may adjust the rotation speed of one or both Risley prisms so that the scan pattern created by the Risley prism-based scanning mechanism 212 may be denser on edge than in the center, as described in more details in FIGS. 6-7.

FIG. 6 illustrates a schematic diagram of an exemplary Risley scan pattern over different durations, according to embodiments of the disclosure. As illustrated, the exemplary Risley scan pattern may be a Rosette pattern that gets denser and denser over time. Part (a) of the figure may illustrate a scan pattern accumulated during the time period 0-t1, part (b) of the figure may illustrate a scan pattern accumulated during the time period 0-t2, part (c) may illustrate a scan pattern accumulated during the time period 0-t3, and part (d) may illustrate a scan pattern accumulated during the time period 0-t4, where t4>t3>t2>t1. It can be seen that, from part (a) to part (d), "petals" 602 for the Rosette keep rotating around a same center, thereby continuously increasing the coverage area and also the density of the coverage area. As illustrated in the figure, the sampling density is highest in the center for this Rosette pattern achieved by Risley prism-based scanning. This may be beneficial for ranging since the center of the scanning area (or field-of-view of transmitter 102) is normally the focused area during a ranging process.

Figure 7:
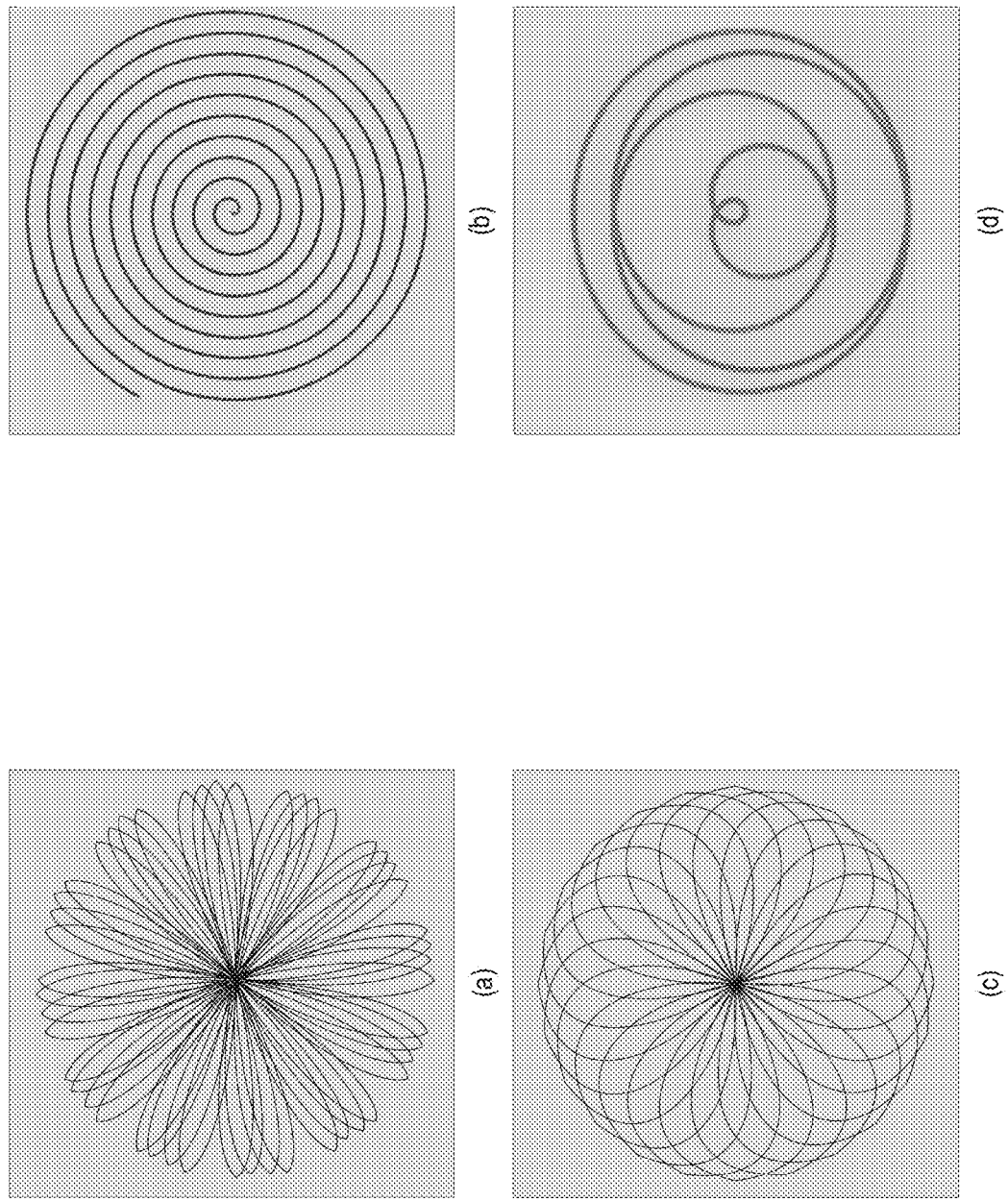
FIG. 7 illustrates a schematic diagram of different Risley prism-based scan patterns, according to embodiments of the disclosure.

FIG. 7 illustrates a schematic diagram of exemplary different Risley scan patterns, according to embodiments of the disclosure. As can be seen from the figure, part (a) of the figure illustrates the Rosette scan pattern described above, part (b) illustrates a spiral scan pattern, part (c) illustrates another Rosette scan pattern, and part (d) illustrates a heart scan pattern. As can be seen from the figure, although both parts (a) and (c) have Rosette scan patterns, these two scan patterns may still show a certain difference. For instance, the Rosette scan pattern in part (a) may be denser in the center and sparser on the edge, while the Rosette scan pattern in part (c) may be denser both in the center and on the edge, which means that a different scan pattern may generate a different focusing area in a target scanning region. The difference between Rosette scan patterns in part (a) and part (c) may be due to the different rotation speeds for part (a) and part (c) when the two Risley prisms are rotating in two opposite directions (e.g., one prism rotates clockwise and the other one rotates anti-clockwise if viewed from a same direction).

As also can be seen from FIG. 7, the spiral scan pattern in part (b) and the heart scan pattern in part (d) look quite different from the Rosette scan patterns shown in parts (a) and (c). This difference may be due to the reason that the two Risley prisms generating scan patterns shown in parts (b) and (d) may only rotate in a same direction (e.g., both rotate clockwise or both rotate anti-clockwise), but not in opposite directions for scan patterns shown in parts (a) and (c). The difference between parts (b) and (d) again may be due to the different rotation speeds of the two Risley prisms when they rotate in the same rational direction. Accordingly, as described in FIGS. 5A-5B, by adjusting the rotation speed, and/or by changing platform configurations to change the rotation direction if necessary, different scan patterns may be generated, to allow different focusing areas to be scanned.

It is to be noted that the above four scan patterns shown in FIG. 7 are merely for illustrative purposes, but not for limitation. In practical applications, the rotation speeds and ration directions of the two Risley prisms (even more than two Risley prisms) can be actively adjusted or modified, to accommodate different focus areas (e.g., center, edge, or middle part of the scanning area) in an environment sensing.

Figure 8:
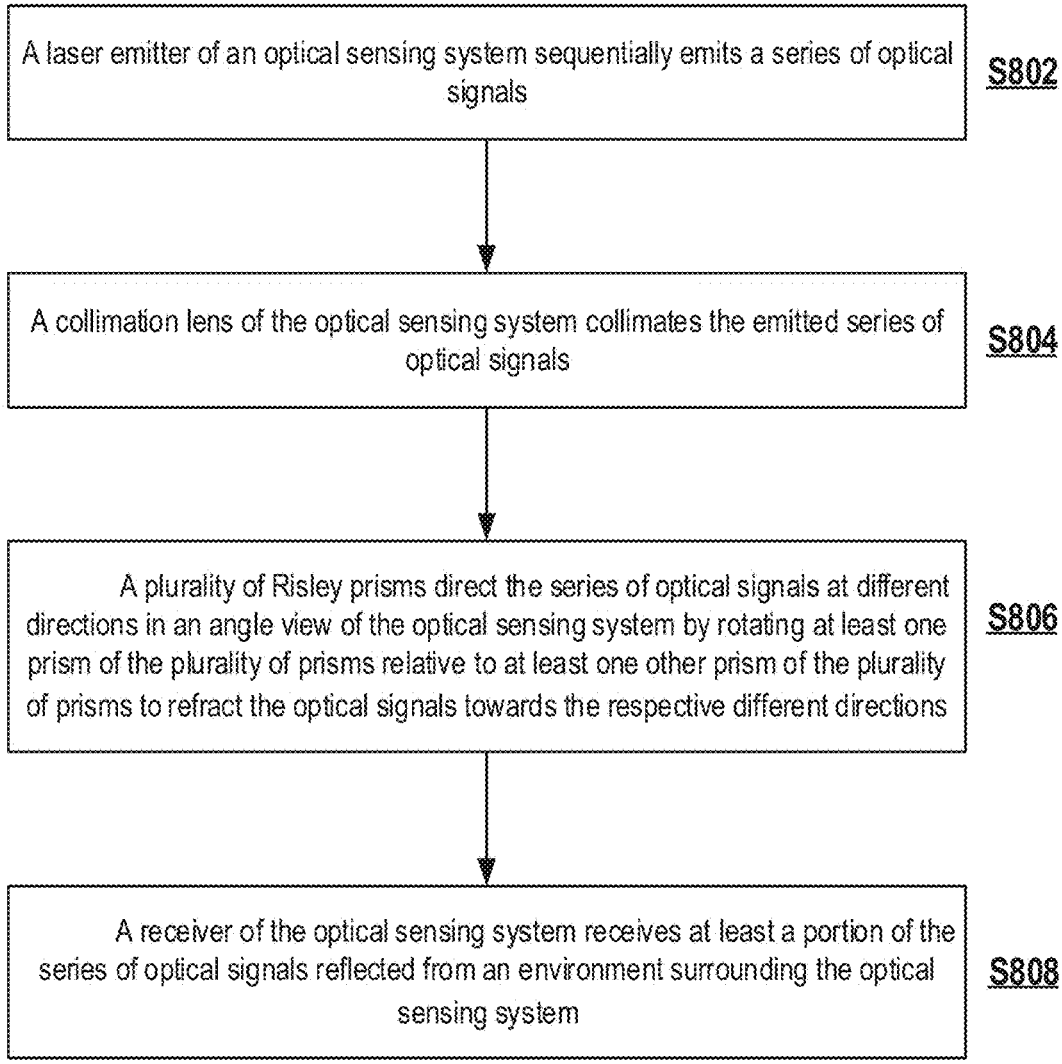
FIG. 8 is a flow chart of an exemplary optical sensing method performed by a LiDAR system containing a Risley prism-based scanning mechanism, according to embodiments of the disclosure.

FIG. 8 is a flow chart of an exemplary optical sensing method 800 performed by a LiDAR system (e.g., LiDAR system 102) containing Risley prisms for steering, according to embodiments of the disclosure. In some embodiments, method 800 may be performed by various components of LiDAR system 102, e.g., transmitter 202 containing Risley prism-based scanning mechanism 212, receiver 204, and/or controller 206. In some embodiments, method 800 may include steps S802-S808. It is to be appreciated that some of the steps may be optional. Further, some of the steps may be performed simultaneously, or in a different order than that shown in FIG. 8.

In step S802, an optical source (e.g., laser emitter 208) inside a transmitter of an optical sensing system (e.g., transmitter 202 of LiDAR system 102) may emit a series of optical signals. Here, the series of optical signals may be emitted by the optical source at a predefined time interval. In addition, the series of signals may have a same wavelength and have a same power during a certain period when the optical sensing system is sensing an environment surrounding the system.

In step S804, one or more collimation lens (e.g., optics 210 of LiDAR system 102) may dynamically collimate the series of optical signals emitted by the light source. A collimation lens may be a fixed lens that collimates the series of optical signals to a same bean divergence. In some embodiments, a collimation lens may collimate the series of optical signals to varying beam divergences. For instance, a collimation lens may be a tunable collimation lens that can be adjustable and thus allow the collimated optical signals to have different divergence values. In some embodiments, the collimated optical signals with same or different divergences may incident upon a surface of a scanning mechanism (e.g., Risley prism-based scanning mechanism 212) for steering.

In step S806, the scanning mechanism (e.g., Risley prism-based scanning mechanism 212 in transmitter 202 of LiDAR system 102) may steer the collimated optical signals output from the collimation lens(es) towards the environment surrounding the optical sensing system. The scanning mechanism may steer the collimated optical signals according to a predefined pattern, so that different parts of an area of interest may be scanned over a short period of time. According to one embodiment, a controller (e.g., controller 506) may control each Risley prism in Risley prism-based scanning mechanism 212 to rotate at a predefined speed and direction, so that a specific scan pattern may be followed when Risley prism-based scanning mechanism 212 steers the collimated optical signals from the collimation lens(es) towards the area of interest in the environment. By continuously steering the incoming optical signals collimated by the collimation lens(es), the whole area of interest may be scanned following the predefined scan pattern.

In some embodiments, the controller may adjust the scan pattern to enable the scanning to focus on a different area. For instance, after an initial scan, the scanned information may be obtained by controller 206 to briefly analyze the objects in the area of interest. If the analysis based on the initial scan indicates that more objects are located on the edge of the area of interest but not in the central area, the controller may change the rotation speeds of one or more of the Risley prisms so that a different scan pattern may follow in the coming scanning process, so that the focus of the coming scanning process can be changed from the central area to the edge area of the area of interest.

In step S808, a receiver (e.g., receiver 204 of LiDAR system 102) of the optical sensing system may receive at least a portion of the returning series of optical signals. The receiver may include a photodetector with multiple pixels. The retuning series of optical signals may be detected by one or more pixels inside the photodetector. In some embodiments, these received optical signals may be converted to electrical signals and further to digital signals, which are then forwarded to a signal processing system or data analysis system of the optical sensing system (e.g., controller 206 of LiDAR system 102) for further processing. For instance, controller 206 may analyze the distribution of the detected objects, and may further determine whether a current scan pattern is proper. If not, controller 206 may communicate with controller 506 (if controller 506 is independent of controller 206) to inform a scan pattern change. Controller 560 may change voltage differential applied to one or more of the Risley prisms, so that a different scan pattern may be then followed by the Risley prism-based scanning mechanism 212. By dynamically adjusting the scan pattern, a better detection result may be achieved for the optical sensing system.

Although the disclosure is made using a LiDAR system as an example, the disclosed embodiments may be adapted and implemented to other types of optical sensing systems that use receivers to receive optical signals not limited to laser beams. For example, the embodiments may be readily adapted for optical imaging systems or radar detection systems that use electromagnetic waves to scan objects.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. An optical sensing system, comprising:
    a laser emitter, configured to sequentially emit a series of optical signals;
    a plurality of prisms, configured to receive the series of optical signals and sequentially direct the series of optical signals at different directions in an angle of view of the optical sensing system, wherein at least one prism of the plurality of prisms is configured to rotate relative to at least one other prism of the plurality of prisms to refract the optical signals towards the respective different directions;
    a plurality of micro-electromechanical system (MEMS)-based angular comb drive actuators configured to individually rotate each prism, wherein the plurality of MEMS-based angular comb drive actuators are circularly mounted around an outer edge of a respective ring-shaped mounting structure corresponding to one prism in the plurality of prisms, and each prism is fixedly mounted around an inner edge of its respective ring-shaped mounting structure such that its surface upon which the series of optical signals impinge is parallel to a plane formed by the inner edge of its respective ring-shaped mounting structure, wherein each MEMS-based angular comb drive actuator comprises a set of stationary teeth, a set of rotary teeth, a first stationary anchor, an elongated beam, a single spring structure, and a second stationary anchor, the set of stationary teeth are coupled to the first stationary anchor, the set of rotary teeth are coupled to a first side of the elongated beam, the elongated beam comprises a first end coupled to the outer edge of its ring-shaped mounting structure and a second end coupled to the second stationary anchor via the single spring structure, the single spring structure is the only spring structure coupled to the elongated beam, and a direction normal to the plane in which the single spring structure provides compliance is parallel to a center axis around which its corresponding ring-shaped mounting structure rotates; and
    a receiver, configured to receive at least a portion of the series of optical signals reflected from an environment surrounding the optical sensing system.

2. The optical sensing system of claim 1, where each of the plurality of prisms is configured to rotate independently from each other around a rotation axis aligned with a light path of the series of optical signals.

3. The optical sensing system of claim 1, wherein each MEMS-based angular comb drive actuator comprises a stationary angular comb formed from the set of stationary teeth and the first stationary anchor and a movable angular comb formed from the set of rotary teeth and the elongated beam.

4. The optical sensing system of claim 3, wherein radial movements of movable angular comb of the plurality of MEMS-based angular comb drive actuators collectively rotate the respective ring-shaped mounting structure and the corresponding prism inside the respective ring-shaped mounted structure.

5. The optical sensing system of claim 3, wherein each of the set of stationary teeth and the set of rotary teeth comprise a respective set of arc-shaped teeth.

6. The optical sensing system of claim 1, wherein the at least one of the plurality of prisms is configured to rotate according to a predefined pattern determined according to the different directions.

7. The optical sensing system of claim 6, wherein the predefined pattern specifies, for each different direction, a relative rotation angle between the at least one prism and the at least one other prism.

8. The optical sensing system of claim 1, wherein the plurality of prisms are Risley prisms.

9. An optical sensing method for an optical sensing system, comprising:
    sequentially emitting, by a laser emitter, a series of optical signals;
    directing, by a plurality of prisms, the series of optical signals at different directions in an angle of view of the optical sensing system by rotating at least one prism of the plurality of prisms relative to at least one other prism of the plurality of prisms to refract the optical signals towards the respective different directions, wherein a plurality of micro-electromechanical system (MEMS)-based angular comb drive actuators individually rotate each prism, wherein the plurality of MEMS-based angular comb drive actuators are circularly mounted around an outer edge of a respective ring-shaped mounting structure corresponding to one prism in the plurality of prisms, and each prism is fixedly mounted around an inner edge of its respective ring-shaped mounting structure such that its surface upon which the series of optical signals impinge is parallel to a plane formed by the inner edge of its respective ring-shaped mounting structure, wherein each MEMS-based angular comb drive actuator comprises a set of stationary teeth, a set of rotary teeth, a first stationary anchor, an elongated beam, a single spring structure, and a second stationary anchor, the set of stationary teeth are coupled to the first stationary anchor, the set of rotary teeth are coupled to a first side of the elongated beam, the elongated beam comprises a first end coupled to the outer edge of its ring-shaped mounting structure and a second end coupled to the second stationary anchor via the single spring structure, the single spring structure is the only spring structure coupled to the elongated beam, and a direction normal to the plane in which the single spring structure provides compliance is parallel to a center axis around which its corresponding ring-shaped mounting structure rotates; and receiving, by a receiver of the optical sensing system, at least a portion of the series of optical signals reflected from an environment surrounding the optical sensing system.

10. The optical sensing method of claim 9, wherein, when directing the series of optical signals at different directions, the at least one of the plurality of prisms rotationally move according to a predefined pattern.

11. A prism-based scanning mechanism, comprising:
a plurality of prisms;
a ring-shaped mounting structure surrounded by each of the plurality of prisms;
a plurality of MEMS-based angular comb drive actuators circularly mounted around an outer edge of the ring-shaped mounting structure corresponding to one prism in the plurality of prisms, and each prism is fixedly mounted around an inner edge of its respective ring-shaped mounting structure such that its surface upon which a series of optical signals impinge is parallel to a plane formed by the inner edge of its respective ring-shaped mounting structure, wherein each MEMS-based angular comb drive actuator comprises a set of stationary teeth, a set of rotary teeth, a first stationary anchor, an elongated beam, a single spring structure, and a second stationary anchor, the set of stationary teeth are coupled to the first stationary anchor, the set of rotary teeth are coupled to a first side of the elongated beam, the elongated beam comprises a first end coupled to the outer edge of its ring-shaped mounting structure and a second end coupled to the second stationary anchor via the single spring structure, the single spring structure is the only spring structure coupled to the elongated beam, and a direction normal to the plane in which the single spring structure provides compliance is parallel to a center axis around which its corresponding ring-shaped mounting structure rotates; and at least one controller coupled to the plurality of MEMS-based angular comb drive actuators to control a rotation of each of the plurality of prisms.

12. The prism-based scanning mechanism of claim 11, wherein each of the set of stationary teeth and the set of rotary teeth include a respective set of arc-shaped teeth.

13. The optical sensing system of claim 1, wherein each spring structure comprises a Chevron spring.

14. The optical sensing method of claim 9, wherein each spring structure comprises a Chevron spring.

15. The prism-based scanning mechanism of claim 11, wherein each spring structure comprises a Chevron spring.

* * * * *